Dec. 25, 1962  E. F. UPTON, JR  3,070,744
TEMPERATURE COMPENSATED SEMICONDUCTOR REFERENCE DEVICE
Filed Jan. 8, 1960

INVENTOR
ERNEST F. UPTON, Jr.

BY Charles A. Weigel

ATTORNEY

United States Patent Office 3,070,744
Patented Dec. 25, 1962

3,070,744
TEMPERATURE COMPENSATED SEMICON-
DUCTOR REFERENCE DEVICE
Ernest F. Upton, Jr., Poughkeepsie, N.Y., assignor to
Daystrom Incorporated, Murray Hill, N.J., a corporation of Texas
Filed Jan. 8, 1960, Ser. No. 1,338
3 Claims. (Cl. 323—69)

This invention relates to a regulated source of electrical energy and more particularly to a bridge type regulated current supply utilizing a regulating junction diode device in which the diode physically is so associated with its compensating resistor that the effects of temperature variations upon the output current are minimized to a point of substantial elimination.

In the prior art, industrial potentiometers having one quarter of one percent accuracy, used for the recording of process information, for example, have up until recently been designed to utilize the dry cell battery for the supply of measuring current and the standard cell for the control of the instrument accuracy. Typical systems of this type, for example, are described in the Wills Patent 2,423,540, issued July 8, 1947. While this arrangement has been generally accepted, its drawbacks are many, i.e., battery life is limited and failure is often unpredictable; assumptions regarding battery behavior which are required to insure accuracy are often inaccurate. Also the standard cell is usually constructed of glass and accordingly, is quite fragile. This increases the handling difficulty. With the standard cell, it is usual to interrupt the measurement in order to compare and adjust a portion of the battery voltage to that of the standard cell. Although ingenious timing mechanisms have been developed to achieve this standardization, both electrical as well as mechanical switching are required to connect the standardizing circuits and to permit the potentiometer mechanisms to drive an adjusting rheostat. Due to the complex mechanisms required, these prior art supplies are relatively expensive, present a relatively high maintenance cost, and are somewhat unreliable.

Circuits are in existence which utilize semiconductor devices, such as Zener diodes, as reference elements to provide regulated direct current supplies for instrument usage. Such circuits are quite capable of fully replacing the dry cell and standard cell described above. Two circuits of this type are known as a shunt diode regulator and a bridge diode regulator, respectively.

Such circuits, which utilize a semiconductor as a reference element, rely generally on the Zener and avalanche breakdown phenomena which occur in semiconductor diodes. The so called "Zener effect" and avalanche breakdown phenomena are described, for example, beginning on page 115 of a book entitled "Semiconductors and Transistors," by Douglas M. Warschauer, McGraw-Hill Book Co. In the several years that voltage regulating, or reference, diodes have been available commercially, there have been substantial improvements in their characteristics. Some of the more elaborate double and triple anode devices, however, are somewhat more than is desirable for many industrial instrument usage. The instrument engineer, therefore, is limited to circuits utilizing a single anode semiconductor device. Unfortunately, the regulating (Zener) voltage of these semiconductor devices must be temperature compensated. In the typical bridge type regulator circuit, for example, the compensating resistor is placed in series with the load. To achieve proper compensation the diode and compensating resistance must be maintained at substantially the same temperature. One method of maintaining a zero temperature difference between these elements is to place both elements in an oven. This solution is unsatisfactory due to the power required as well as extra cost of the oven and associated equipment.

It is therefore an object of this invention to overcome many of the above disadvantages of the prior art.

It is an object of this invention to provide a regulated direct current supply.

It is a further object of this invention to provide a bridge type regulated current supply for instrument usage that is substantially independent of temperature variations.

It is another object of this invention to provide an improved regulated direct current supply utilizing a Zener diode in which temperature variations between the Zener diode and its compensating resistance are substantially eliminated.

In an illustrative embodiment of this invention a regulated current supply is constructed by connecting an alternating current (A.-C.) power source through a transformer, a half-wave rectifier and a filter. The output of the filter, which is a fluctuating direct current (D.-C.) voltage is then regulated by two regulator stages. The first regulator stage is a conventional shunt regulator circuit wherein two serially connected Zener diodes are placed in shunt with the load. The second is a bridge type regulator, using a Zener diode for regulation, which is placed across the shunt regulator.

The diode in the bridge regulator is placed on one arm to bias the output of an otherwise balanced bridge. Since the regulating diode is operated in its breakdown region, the bridge is balanced with respect to the dynamic impedance of the regulating diode in the breakdown region. To compensate for the Zener voltage changes with temperature, a compensating resistor whose resistance varies in accordance with temperature is placed in series with the load. In constructing the bridge circuit, the regulating diode is encapsulated within its compensating resistor such that little or no temperature difference can exist therebetween. This arrangement provides an inexpensive yet highly stable current source.

Further advantages and features of this invention will become apparent upon consideration of the following description read in conjunction with the drawing wherein.

Figure 1:
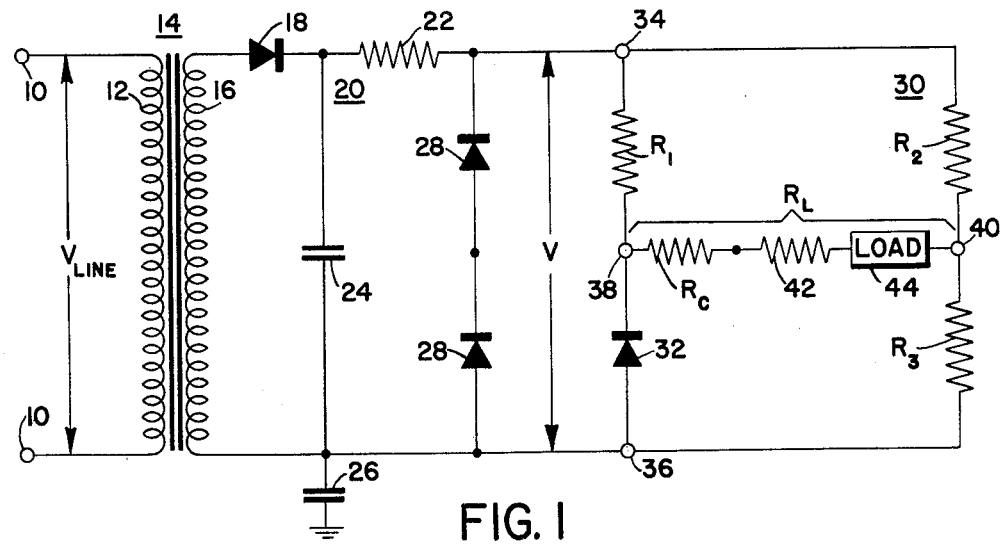
FIGURE 1 is a schematic circuit diagram illustrating a conventional regulated current supply utilizing a bridge type regulator of the type employed in this invention.

In FIG. 1 a conventional regulated current supply has a pair of terminals 10 which may be coupled across a standard 120 volt A.-C. power source denoted as $V_{line}$. The terminals 10 are coupled to the primary 12 of a step-down transformer 14 which also has a secondary winding 16. The upper terminal of the secondary winding 16 is coupled through a rectifying diode 18 to a filter 20 which includes a serially connected resistor 22 and a shunt capacitor 24 coupled between the cathode of the rectifying diode 18 and ground (through a second capacitor 26).

Next, a shunt regulator circuit is coupled across the filter 20. The shunt regulator circuit includes a pair of serially connected semiconductors 28 poled such that the fluctuating voltage from the filter 20 is in the reverse conducting direction of the diodes. The semiconductors 28 are of the junction type which have a predetermined breakdown voltage. It is stated in the book previously cited that it was once thought that all junction breakdown in semiconductors was due to internal field emission or Zener effect. It is now known that the Zener effect is observed only in extremely thin junctions. In thicker junctions the breakdown which occurs is referred to as avalanche breakdown. Thus, it may be stated that the pair of diodes 28 may be any junction type semiconductor such as a Zener diode, a silicon junction diode, or other diode which has a predetermined breakdown voltage as will be described in more detail below with respect to FIG. 2. These diodes are often referred to as regulating diodes, which terminology will be employed herein.

Figure 2:
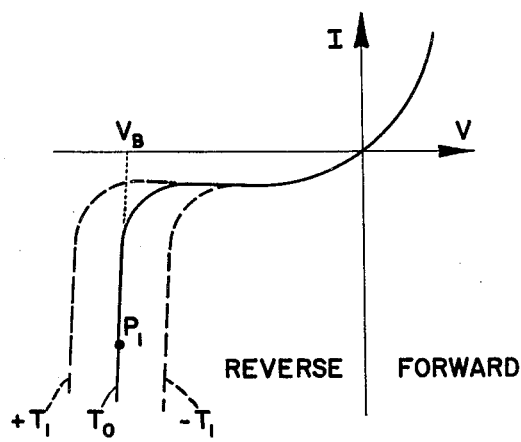
FIGURE 2 is a graph to illustrate the relationship between current plotted as the ordinate and voltage plotted as the abscissa that exists in a typical junction diode that is employed in the circuit of FIG. 1.

A bridge type current regulator is connected across the shunt regulator diodes 28. The bridge regulator 30 includes four arms connected in series. Three of these four arms include resistors $R_1$, $R_2$ and $R_3$. The fourth arm which is connected in series with the first resistor $R_1$ and across the shunt regulator diodes 28 includes a bridge regulating diode 32. The bridge regulating diode 32 may be of the same type as the shunt regulating diodes 28. In the bridge circuit 30 the opposite junctions 34 and 36 which are connected across the shunt regulating diodes 28 are the input terminals of the bridge. The remaining opposite junctions 38 and 40 are the output terminals of the bridge. The load circuit is coupled across the output terminals 38 and 40, respectively. The load circuit includes a serially connected compensating resistor $R_c$, a second resistor 42 constructed of maganin wire and the schematically illustrated load 44 which may be, for instance, the slide wire circuit of an instrument type potentiometer. In FIG. 2 a typical voltage-current characteristic of a silicon regulator diode such as the bridge regulating diode 32 (FIG. 1) is illustrated. In FIG. 2 the relationship between applied voltage across the diode and the resulting current that flows through the diode is illustrated. It will be observed from this characteristic of FIG. 2 that as the voltage across the diode is increased in a reverse direction (that direction opposite to the forward conducting direction of the diode) the reverse current flow through the diode is virtually zero until a point is reached at which the diode breaks down. This point is designated in the drawing $V_b$ and is known as the breakdown or Zener voltage of the diode. Once this point is reached, the reverse current that flows through the diode then increases rapidly for relatively small increases in the reverse voltage applied across the diode. It is this characteristic in the breakdown region (beyond the breakdown point $V_b$) that allows the diode to regulate. The slopes of the curve of FIG. 1 are the equivalent of the dynamic resistance $R_d$ of the diode at the different operating points. Thus, it may be observed that before breakdown is reached, the diode resistance is very high—in the order of hundreds of megohms; after the breakdown point is reached and when the diode is operated in the breakdown region (the applied voltage exceeding the breakdown voltage $V_b$), the diode resistance is in the order of a few ohms. As is known, breakdown in the semiconductor is not destructive.

It is known that the breakdown voltage $V_b$ varies as a function of temperature. Thus, the characteristic illustrated by the solid line is that which exists for some base temperature $T_0$. In diodes utilizing the Zener effect, for example, the breakdown Zener voltage $V_b$ has a positive temperature coefficient such as represented by the dashed curves $+T_1$ and $-T_1$ corresponding respectively to an increase and a decrease in temperature. In other type junctions the breakdown voltage decreases with a temperature increase. For example, the temperature coefficient exhibited by single alloy junction regulating diodes is increasingly negative for units having a breakdown voltage below approximately 5 volts and an increasingly positive temperature coefficient for diodes chosen to regulate at voltages in excess of 5 volts.

In accordance with known techniques, this sensitivity to temperature change of the bridge regulating diode 32 and the bridge regulator circuit 30 is compensated for by use of the compensating resistor $R_c$ also having a positive temperature coefficient of resistance. Unfortunately, in the prior art, the compensating resistor was often placed physically apart from the diode for which it was to provide electrical compensation. Because of this physical separation the temperature of the compensating resistor and the regulated diode were often different. The result was incomplete compensation for the effects of temperature variation.

Figure 3:
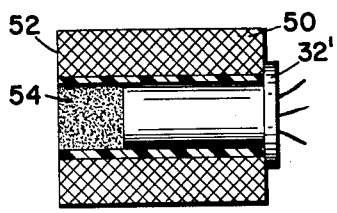
FIGURE 3 is a sectioned drawing illustrating an alternative manner in which another type of regulating diode of FIG. 1 may be encapsulated in its compensating resistor.
Figure 4:
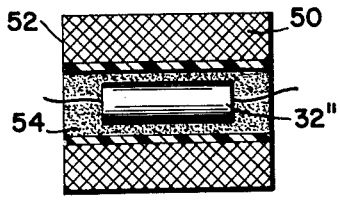
FIGURE 4 is a sectional drawing illustrating another alternative manner in which another type of regulating diode of FIGURE 1 may be encapsulated in its compensating resistor.

In accordance with this invention, this difficulty is overcome by the use of structures of the type illustrated in FIGS. 3 and 4. Thus, in FIG. 3, the resistance element 50 making up the compensating resistor $R_c$ is wound about a bobbin or spool 52 having a hollow core shaped to accept a diode. The regulating diode 32' (here illustrated as having a cap) is placed in this hollow core which in most cases will be cylindrical in physical contact with the bobbin 52 thereby to improve the heat transfer between the resistance element 50 and the regulating diode 32'. A silicon grease or other heat conducting material 54 that retains its viscosity when heated is placed adjacent the diode 32' to fill the air space and insure proper heat transfer.

In similar manner, if the diode employed is cylindrical in shape but without a cap, as is illustrated in FIG. 3, the arrangement of FIG. 4 may be employed wherein the cylindrical diode 32" is placed in the core of the bobbin 52. The remaining parts are identical and accordingly have been given the same reference numbers. Other mechanical constructions than those shown above may, of course, be employed, the object of such constructions, of course, being to insure the close spacing of the regulating diode 32 and its compensating resistor $R_c$ such as substantially to eliminate any temperature difference that may exist therebetween.

The operation of the circuit of FIG. 1 is such that the line voltage applied to the terminals 10 is stepped down by the transformer 14 to a desired voltage which is selected depending upon the breakdown voltage characteristics of the diodes to be employed and that required for the load 44. This stepped down voltage from the secondary 16 is rectified by the rectifying diode 18, filtered by the filter circuit 20, and applied to the shunt regulator 28. As is known in the shunt regulator circuit, the regulating diodes 28 are placed in shunt with the load $R_L$ and act as a current overflow device with a particular bias potential determined by the breakdown voltage. Thus, when the voltage V across the diodes 28 is low, almost all of the current is carried by the load. When the voltage is raised above the breakdown voltage, however, the increase in reverse current is carried by the diodes 28. As may be observed from the curve of FIG. 2, the voltage change, once breakdown is reached, is relatively small. Thus, the voltage V applied to the bridge regulator circuit 30 is relatively constant, being susceptible to only minor variation due to changes in line voltage and temperature.

The bridge regulator circuit 30 is also a known circuit whose operation has been described in an article by Michel Mamon appearing in the January 1957 issue of Electrical Manufacturing. As is described in this and other literature, the bridge regulator utilizes the regulator diode 32 to bias the output of the otherwise balanced bride circuit. It is this bias which develops a relatively constant potential. The bias voltage produces, in turn, a constant current flow through the load $R_L$. If the bridge is balanced, incremental changes in the bridge supply voltage V, supplied across the input terminals 34, 36 have little or no effect on the bridge output current to the load. Since the regulating diode 32 is operated in its breakdown region, the bridge is balanced against the dynamic resistance $R_d$ of the regulating diode 32 at its operating point which is illustrated in the characteristic of FIG. 2 by the point P which lies in the third quadrant along the diode characteristic in the breakdown region. Thus, to balance the bridge, the values of the resistors in the four arms $R_1$, $R_2$, $R_3$ and $R_d$, the dynamic resistance of the regulating diode 32 are selected such that $$\frac{R_d}{R_1+R_d}=\frac{R_3}{R_2+R_3} \quad (1)$$

The values of the resistors in the arms of the bridge 30 are also selected so that the regulating diode 32 is capable of passing the desired operating current.

If, for example, the line voltage fluctuates such that the bridge regulator input voltage V decreases from some positive value, the proportionate reverse voltage across the regulating diode 32 also drops. As may be observed, from the current voltage characteristic of FIG. 2, with even a slight voltage drop there is a relatively great decrease in current flow through the regulating diode 32. By the diode 32 drawing less current, the effect of the voltage drop is compensated since more current is available to the load $R_L$. By conventional circuit analysis it may be demonstrated that $I_0$ the current through the load $R_L$ is determined by the following equation:

$$I_0=\frac{E\left(\frac{R_1}{R_1R_d}\right)}{R_L+Z} \quad (2)$$

where E is the regulating voltage of the diode 32 at its particular operating point P and where Z is the internal impedance of the bridge 30 which is determined by the following equation:

$$Z=\frac{R_1R_d}{R_1+R_d}+\frac{R_2R_3}{R_2+R_3} \quad (3)$$

It may be noted from the above idealized relationship that the bridge supply voltage V is absent from the Expression 2 such that the output current is substantially independent of variations in supply voltage. Unfortunately, however, the regulating voltage E of the diode does vary with temperature as noted above. If the regulating diode 32 has a positive temperature coefficient, the regulating voltage of the diode shifts in the manner illustrated by the curve $T_1$ in FIG. 2. That is, as the temperature of the diode increases, the regulating voltage E also increases. The reverse is also true as illustrated by the dashed curve $-T_1$. This variation is compensated for by a compensating resistor $R_c$ also having positive temperature coefficient. Thus, if the regulating voltage of the regulating diode 32 has a temperature coefficient $\alpha$ the above Equation 2 may be expressed as a function of time as $$I_0(t)=\frac{\frac{ER_1}{R_1+R_d}(1+\alpha t)}{R_L+Z} \quad (4)$$

By assigning a temperature coefficient B to a portion of the load resistance $R_1$, say the compensating resistor $R_c$, then $$I_0(t)=\frac{\frac{ER_1}{R_1+R_d}(1+\alpha t)}{R_c(1+Bt)+Z+R_L-R_c} \quad (5)$$

To obtain temperature compensation in the above circuit $$\frac{dI_0}{dt}=0$$

Thus, differentiating and solving Equation 5, it is determined that $$\alpha=\frac{R_cB}{R_L+Z} \quad (6)$$

Thus, by selecting a compensating resistor $R_c$ having a temperature coefficient B related to the temperature coefficient $\alpha$ of the regulating diode 32 as set forth in Equation 6, the effects of temperature variations are virtually eliminated from the circuit. All of the above calculations, of course, assume that the temperature of the compensating $R_c$ and that of the regulating diode 32 are substantially identical. This is achieved by applicant's invention wherein the two elements are mounted in close proximity to each other so as to achieve little or no temperature variations therebetween.

There has thus been described a novel mechanical arrangement of effectively eliminating temperature variations between the regulating diode and its compensating resistor in a bridge type regulator circuit. The mechanical arrangement is both simple and economical and provides a regulator circuit having relatively constant output current that is substantially independent of temperature variations. The bridge regulator circuit constructed in accordance with this invention is fully capable of replacing the old dry cell and standard cell and yet is far less expensive and complex.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. In combination, a semiconductor having a predetermined breakdown voltage, said semiconductor having a relatively constant inverse voltage when operated in the breakdown region, which inverse voltage varies only with temperature, a compensating resistor connected to one terminal of said semiconductor, said compensating resistor also having a resistance that varies with temperature, said compensating resistor including a resistance element wound on a bobbin having a hollow core, said semiconductor being placed in said core in substantial physical contact with said bobbin, whereby temperature variations between said compensating resistor and said semiconductor are substantially eliminated.

2. In combination, a semiconductor having a predetermined breakdown voltage, said semiconductor having a relatively constant inverse voltage when operated in its breakdown region, which inverse voltage varies only with temperature, a compensating resistor connected to one terminal of said semiconductor, said compensating resistor also having a resistance that varies with temperature, said compensating resistor including a cylindrical thermoconductive bobbin having a hollow core, a resistance element wound on said bobbin, said semiconductor being placed in said hollow core, whereby temperature variations between said compensating resistor and said semiconductor are substantially eliminated.

3. The combination set forth in claim 2 wherein said semiconductor is a Zener diode whose resistance has a positive temperature coefficient and which includes silicon grease placed in said hollow core adjacent both said compensating resistor and said diode thereby to insure greater heat conductivity therebetween.

References Cited in the file of this patent

UNITED STATES PATENTS

| | | |
|---|---|---|
| 1,847,653 | Jones et al. | Mar. 1, 1932 |
| 2,620,664 | Lodge | Dec. 9, 1952 |
| 2,640,869 | Zimmerman | June 2, 1953 |
| 2,876,642 | Scorgie | Mar. 10, 1959 |
| 2,915,724 | Fritts | Dec. 1, 1959 |

OTHER REFERENCES

"Static D.C. References for Closed-Loop Controls," Michel Mamon, Electrical Manufacturing, January 1957, pp. 54–61, 292, 294.